April 7, 1964    E. F. MACKS    3,127,955
FLUID SUPPORTED DEVICE
Original Filed March 30, 1956

INVENTOR.
ELMER FRED MACKS
BY Watts, Edgerton, Pyle & Fisher
ATTORNEYS

United States Patent Office 3,127,955
Patented Apr. 7, 1964

3,127,955
FLUID SUPPORTED DEVICE
Elmer Fred Macks, Willow Lane, Vermilion, Ohio
Original application Mar. 30, 1956, Ser. No. 575,185, now Patent No. 3,001,609, dated Sept. 26, 1961. Divided and this application Sept. 26, 1961, Ser. No. 140,792
14 Claims. (Cl. 184—18)

This invention relates to mechanisms having an element movable relative to another element in close surface-to-surface relationship, and more particularly to means for providing an effective lubricating film between the opposing surfaces of such elements to reduce friction and wear.

This application is a division of my copending application Serial No. 575,185, filed March 30, 1956, under the same title, and now issued as Patent No. 3,001,609, on September 26, 1961.

In the mechanical arts, there are many instances where one element moves or slides relative to another element in close surface-to-surface relationship. Typical examples of these are the mechanisms of various types of engines, pumps, compressors and projectiles. Under such conditions, some method must generally be provided for lubricating the opposing surfaces of the elements in order to reduce friction and wear of the confronting parts.

In the past this has usually been accomplished by the use of some type of liquid lubricant. Many times these devices have proven unsatisfactory. Under some conditions, such as extremes of temperatures, it is almost impossible to provide adequate lubrication with previously known arrangements.

The present invention provides novel lubricating means for a mechanism in which an element moves relative to another element in close surface-to-surface relationship. This novel lubricating means is especially suitable for elements which are relatively movable linearly.

More specifically, in the principal embodiments disclosed herein, the movable element is provided with fluid accumulating means, such as a chamber portion having an open end, in communication with a foraminous section defining a wall portion of the movable element and means for supplying fluid under pressure to the fluid accumulating means whereby the fluid flows through the foraminous section to provide an effective lubricating film between the relatively moving parts.

The means for supplying fluid under pressure to the accumulating means may comprise any suitable arrangement such as pressurizing fluid in the accumulating chamber by the movement of the movable element in a volume of fluid medium defined by an associated member. Other examples of suitable means for supplying fluid under pressure are completely separate mechanical means such as a pump device and an inherently pressurizing chemical reaction such as an explosion. As used in this disclosure, the term "foraminous accumulator" is used to designate a part of the mechanism; it will be understood that the member referred to is the movable element. The invention is particularly applicable for providing a film of gaseous fluid lubrication between relatively moving parts, although it may also be used in connection with other types of fluids.

In the copending application for patent Serial No. 433,946 filed June 2, 1954 entitled "Method and Apparatus for Providing Mobility," now abandoned in favor of continuation-in-part application for patent Serial No. 737,969, filed May 26, 1958, under the same title, the broad principles of a self supporting and lubricating mechanism have been disclosed. The present invention contemplates the employment of the basic principles disclosed in that application in a moving accumulator which is carried by a guide.

The confinement guide has a guide surface for directing the relative movement of the fluid accumulator. In its preferred form, the moving accumulator has a foraminous wall with a surface that confronts the guide surface in a closely spaced relationship.

In operation, fluid under pressure is introduced into a chamber in the accumulator member through an open end thereof. The fluid then passes through the foraminous wall and forms a thin film of fluid under pressure between the wall outer surface and the guide surface.

This film consists of a moving fluid which is constantly escaping at either end of the area of confrontation. The film is constantly being replenished by a fresh supply of fluid which passes through the foraminous wall.

As fluid under pressure is passed through a restriction, a pressure drop is experienced. This pressure drop is proportional to the flow of fluid. The greater the flow, the greater the pressure drop; and, conversely, the lower the fluid flow, the lower the pressure drop.

The restriction orifices in the foraminous wall are so located as to provide an inherently self-centering and self-stabilizing effect. In some cases the foraminous wall surface may be covered with a multitude of such restriction orifices, as in the case of sintered permeable materials, while in other cases the wall may contain only a few such restriction orifices carefully located so as to accomplish the intended objectives. The restriction orifices may be connected with shallow recesses or grooves in the foraminous wall support surfaces so as to effectively cover a larger area with one or more restriction orifices. Hence, as used in this application, the word "foraminous" is intended to include a permeable wall which will provide a load carrying film of fluid between the closely spaced surfaces through the mechanism of restricted flow through the wall.

Thus, when fluid is passed through the foraminous wall, a fluid film will be formed in the area of confrontation. Unless the forces exerted against the accumulator have a resultant which is axial, the accumulator will tend to move laterally toward a portion of the guide surface. This movement will reduce the space between the confronting surfaces and therefore the flow of fluid into and through this area will be decreased as well. As the fluid decreases, the pressure drop through the foraminous wall decreases and the mean film pressure increases. Conversely, on the opposite side of the moving accumulator, the mean pressure will be relatively low since the space in the area of confrontation, the fluid flow and the pressure drop have all been increased. It will thus be seen that the relative movement of the accumulator may be slightly eccentric with respect to the guide surface, but that the resultant of the pressure exerted by the fluid film is always a force tending to move the piston into a position where the axes of the accumulator and the guide are coincident.

Through this mechanism, a supporting and lubricating fluid film is formed over the entire area of confrontation. Thus, the two members are able to move relatively without surface-to-surface contact.

It is, therefore, a principal object of this invention to provide a mechanism in which a moving member may be wholly supported on a fluid film to substantially completely eliminate wear of the relatively moving parts.

In many applications such as a gas compressor, an internal combustion engine, or a valve pressurized fluid is available in the operating mechanism. This fluid may be introduced under pressure into the foraminous accumulator to provide the lubricating means. The fluid need not be a lubricating oil but may be air, water, or other fluids which are not normally considered lubricants.

It is, then, an additional object of this invention to provide a mechanism wherein relatively moving parts may be lubricated without the addition of any special lubricating material. The cost of operation is thus materially reduced, the performance materially increased, and the likelihood of damage due to failure of the operator to lubricate the mechanism is completely eliminated.

Another object of this invention is to provide a mechanism having a member adapted for movement in close surface-to-surface relationship with respect to another member and novel means for providing an effective film of lubrication between the opposing surfaces of said members.

A further object of this invention is to provide a novel system utilizing a gaseous fluid for lubricating elements of a mechanism that are relatively movable in close surface-to-surface relationship.

A more specific object of this invention is to provide a mechanism in which a member such as a foraminous accumulator is movable in close surface-to-surface relationship with respect to another member, such as a guiding casing arrangement or a guide rod. The one member comprises a lubricant containing portion having an open end and a foraminous surface defining said portion, and the other of the members comprises a guideway defining the path of travel of the one member. The mechanism also has means for exerting a pressure on the lubricant in said lubricant containing portion of the first named member whereby the lubricant flows through said foraminous surface and provides a fluid film between the members to effectively reduce friction and eliminate wear occurring on the members when they are moved relatively.

Other objects and a fuller understanding of the invention may be had by referring to the following description and claims, taken in conjunction with the accompanying drawing, in which:

Figure 1:
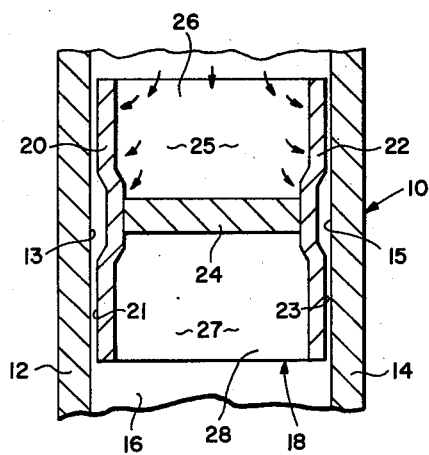
FIGURE 1 is a fragmentary diagrammatic sectional view of a casing and foraminous accumulator arrangement embodying the invention wherein a distensible foraminous wall is employed.

Referring now to FIGURE 1 of the drawings, there is shown a guide member in the form of a casing 10 having enclosing walls 12 and 14. The walls 12, 14 define a fluid containing cavity 16. The ends of the guide member 10 may be open or they may be closed over, depending on the particular type of application in which the mechanism is to be employed.

An accumulator member 18 is disposed in the guide or casing 10 in close surface-to-surface relationship with inner surfaces 13, 15 of the walls 12, 14. In this illustrated embodiment, the accumulator member is of piston-like configuration. It will be seen that the casing 10 forms a guideway defining the path of travel of the accumulator member 18. The guide member 10 and the accumulator member 18 need not be of circular cross sectional configuration. It will be understood that any method of transmitting force to or from the accumulator member 18 may be used. Examples are fluid pressure, magnetic and electrical actuating arrangements, or a chemical reaction involving an explosive force. Such actuating means may exist at one or both ends of the movable member 18.

In the embodiment illustrated in FIGURE 1, the accumulator member 18 is formed by side walls 20 and 22 and a transverse, intermediate wall 24. The walls define a pair of chamber portions 25 and 27 having open ends 26 and 28, respectively, for permitting fluid to be received and accumulated in chamber portions as will hereinafter be more fully described. The walls 20, 22 of the accumulator members have outer surfaces 21, 23 respectively. For purposes of illustration, these surfaces 21, 23 have been shown spaced a considerable distance from the opposing guide surfaces 13, 15 of the casing 10. It will be understood that in actual practice, this spacing will generally be an extremely small dimension. In a piston and casing embodiment as shown, the spacing will usually be of the order of 0.0001 to 0.010 inch per inch of cross section. It is to be understood that this spacing is dependent upon fluid, speed, load and other conditions of the particular application.

The walls 20, 22 of the accumulator member 18 are formed of a foraminous material, such as a fluid permeable plastic material, and preferably are distensible. The foraminous walls 20, 22 provide restricted communication between either or both of the chamber portions 25, 27 and the opposing surfaces 21, 13 and 23, 15.

When fluid is present in the cavity 16 and the accumulator member 18 is moved relative to the casing 10 toward one end thereof, fluid will be pressurized and accumulated in the chamber portion that opens at the forward end of the relatively moving accumulator member. For example, when the accumlator member is moving vertically upwardly, as viewed in FIGURE 1, fluid will flow into the chamber portion 25, as indicated by the arrows. The pressure in the chamber 25 increases as the pressure in the cavity 16 is being increased by compressing the fluid above the accumulator member. Since the member 18 is open at the opposite end 28, fluid will be similarly accumulated under pressure in the chamber 27 when the accumulator member is moved vertically downwardly, as viewed in FIGURE 1.

Thus, fluid under pressure is accumulated in one of the chamber portions 25 and 27. This trapped or accumulated pressurized fluid flows through the foraminous wall sections 20, 22 defining the chamber portion to provide a continuous lubricating film of fluid between the opposing surfaces 13, 21 and 15, 23. This film supports the accumulator 18 out of frictional surface-to-surface contact with the guide member 10.

The rate of fluid flow through foraminous walls 20, 22 will depend in part upon the difference in pressure between the fluid in the chamber portion 25 or 27 and the fluid in the space between the accumulator and guide member surfaces 21, 13 and 23, 15 respectively. Accordingly, an adequate supply of lubricating fluid is insured under all operating conditions. The capacity of each chamber portion 25 and 27 is such that a continuous lubricating film is produced between the surfaces 21, 22 and opposing surfaces 13, 15.

As fluid is accumulated under pressure in one or the other of the chamber portions 25, or 27, the pressurized fluid causes the walls 20, 22 to distend outwardly toward the enclosing guide member 10 while fluid is at the same time forced through the porous structure of the walls to provide a fluid lubrication film between the members 10 and 18. The physical dimensions of the accumulator member 18 are thus automatically controlled by the pressure of the accumulated fluid in the chamber portions 25 and 27. Thus, the member 18 is conformed to the guide 10 irrespective of irregularities in the guiding surfaces of the latter, and the lubricating film of fluid between the walls 20, 22 and the guiding surfaces of the guide 10 are maintained, preventing surface-to-surface contact.

As the accumulator 18 relatively moves through the casing 10, it may also drift laterally toward one side of the casing. For example, when the accumulator 18 approaches the opposing surface 13 of the guide, the space between the surfaces 13, 21 is reduced. This reduction in space results in an increase in the pressure of the fluid film in this space due to the decrease in the pressure drop through foraminous wall 20 caused by a reduction in fluid flow through wall 20. Conversely, the space between foraminous wall 22 of the member 18 and guide wall 14 of the casing increases as the accumulator member drifts laterally to the left in FIGURE 1. This increase in clearance between surfaces 23, 15 results in a decrease in the pressure of the fluid film due to an increase in pressure drop through the foraminous wall 22 caused by an increase in fluid flow through foraminous wall 22. Thus, the foraminous accumulator and associated guide surfaces constitute an inherent servo mechanism which holds the relatively moving members out of contact irrespective of load components normal to the guiding surfaces. A somewhat similar action occurs when the moving member tilts within the guide surface clearance.

Thus, the operation of the lubricating film producing mechanism is inherently automatic, tending to maintain the accumulator 18 spaced from and floating between the guide surfaces of the guide 10. Accordingly, an effective fluid lubricating film is always produced between the closely spaced relatively moving parts of the mechanism to eliminate frictional contact and resultant wear.

It will be understood that this lubricating and self-centering action occurs irrespective of whether the foraminous accumulator is adapted for relative linear or rotative movement in a vertical, horizontal, or angular direction.

Figure 2:
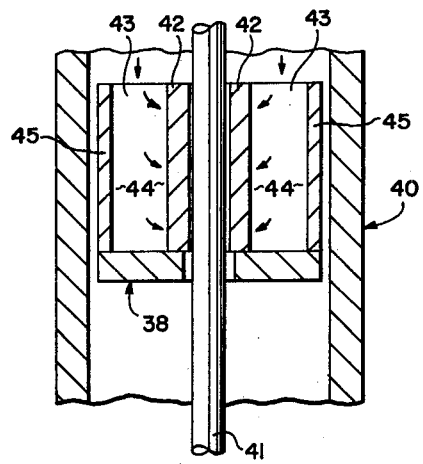
FIGURE 2 illustrates a modification of the invention wherein the foraminous wall of the accumulator is disposed about and cooperates with an inner alignment guide.

FIGURE 2 shows a modified embodiment of the invention wherein the accumulator member, indicated as 38, is guided in its movement in a sleeve 40 by guide member or rod 41. The accumulator member 38 has permeable walls 42 disposed adjacent the guide or rod 41. The clearances between the walls 42 and the rod 41 are less than the clearances between the outer extremities or walls 45 of the member 38 and the sleeve 40 so that there is no possibility of engagement between the two. Upon relative movement of the accumulator member 38 with respect to the sleeve 40, fluid flows into the open end 43 of the accumulator member and is thus accumulated under pressure in chamber portions 44. The fluid passes through permeable walls 42 to provide a lubricating film between the latter walls and the rod 41 in the manner discussed in connection with the embodiment of FIGURE 1.

Figure 3:
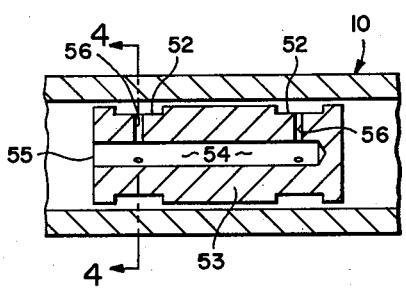
FIGURE 3 is a diagrammatic fragmentary sectional view illustrating still another modification of the invention wherein the foraminous wall of the accumulator takes the form of a plurality of spaced openings; and, FIGURE 4 is a sectional view as seen from the plane indicated by the line 4—4 of FIGURE 3.
Figure 4:
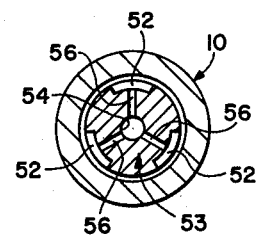

In FIGURES 3 and 4 a further modification of the invention is disclosed. In this modification, a plurality of shallow recesses 52 are provided. These recesses have a substantial circumferential extent about the periphery of the accumulator, which is here indicated as 53. An accumulating chamber 54 open at one end 55 is provided. Metering orifices 56 are formed to connect the chamber 54 and the recesses 52. In this modification fluid under pressure is accumulated in the chamber 54 through its open end 55 and is then passed through the orifices 56 into the recesses 52. The fluid escaping from the recesses forms a fluid film between the casing 10 and the accumulator 53 which is similar in consistency and function to the film formed in the other disclosed embodiments.

Alternately, the recesses 52 may be eliminated and further holes or orifices 56 may be added if the load imposed on the accumulator is sufficient to require additional fluid to form a supporting film.

There has thus been described a mechanism comprising an element movable relative to another element in close surface-to-surface relationship, novel means for providing effective lubrication of the relatively moving parts, and wherein the movable element includes a foraminous portion in communication with means for supplying a pressurized fluid, which portion defines a bearing surface of the movable element whereby fluid is caused to flow through the foraminous portion to provide a lubricating film between the closely opposing bearing surfaces of the elements of the mechanism to minimize friction and to eliminate wear therebetween.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mechanism comprising a tubular gas accumulator member having an internal pressure chamber, said chamber being defined in part by a foraminous wall section of said accumulator, said foraminous wall section having an exposed guided surface, guide means closely adjacent said exposed guided surface of said accumulator member, means surrounding said accumulator member for defining a gas containing cavity, said accumulator member being open at one end for affording communication between said chamber and said cavity, said accumulator member being relatively movable through said cavity for accumulating gas under pressure in said chamber, and said foraminous wall section of said accumulator member forming gas compensating means to permit a constant compensated flow of gas from said chamber through said foraminous wall section to maintain said accumulator in spaced relationship with said guide means and with the greatest flow occuring where said guide means and guided surface of said accumulator member are spaced the greatest to maintain said guide means and guided surface out of contact when the mechanism is in operation.

2. A mechanism comprising a member having side walls and a transverse wall defining an accumulating chamber open at one end of said member, said walls including a foraminous wall section having an exposed bearing surface, guide means closely adjacent said bearing surface for guiding relative movement of said member, means defining a fluid containing cavity, said member being relatively movable through said cavity for accumulating fluid under pressure in said chamber, and said foraminous wall section forming fluid compensating means to permit a constant compensated flow of fluid from said chamber through said foraminous wall section to hold said member in spaced relationship with said guide means and with the greatest flow occurring where said guide means and bearing surface are spaced the greatest to maintain said guide means and bearing surface out of contact when the mechanism is in operation.

3. A mechanism comprising a tubular member having an internal chamber for accumulating fluid under pressure, said member having an open end communicating with said chamber, a tubular casing surrounding said member for defining a fluid containing cavity, said member being relatively movable through said casing in the direction of said open end for accumulating fluid under pressure in said chamber, guide means for guiding relative movement of said member, and said member having a foraminous wall at least partially defining said chamber, said foraminous wall having an exposed bearing surface closely adjacent said guide means, the wall foramina of said foraminous wall providing means to restrict communication between said chamber and said bearing surface so that fluid passing through said restriction means is caused to create and maintain a total load supporting film of fluid under reduced pressure between said bearing surface and said guide means to maintain said bearing surface and guide means in spaced relationship when the mechanism is in operation.

4. The mechanism as claimed in claim 2 wherein said guide means comprises the inner wall surface of said fluid containing cavity, and wherein said foraminous wall defines the circumferential outer wall of said tubular member.

5. The mechanism as claimed in claim 2 wherein said guide means comprises a rod axially extending through said fluid containing cavity, and wherein said foraminous wall defines a radially inner wall of said member that circumferentially surrounds said rod.

6. The mechanism as claimed in claim 2 wherein said foraminous wall is distensible under fluid pressure for causing it to closely conform to said guide means.

7. An assembly comprising a member movable relative to a guide member and another member, said movable member having a foraminous wall section at least partially defining a fluid chamber in said movable member that is open at one end thereof, said other member comprising a casing enclosing said movable member and said guide member, and means for supplying fluid under pressure to said chamber through the open end of said movable member whereby a lubricating film of fluid is produced between said foraminous wall section and said guide member by the flow of fluid from said chamber through said foraminous wall section.

8. A gas actuated mechanism comprising, an element defining a gas supply source, a guide means, a tubular body having a gas accumulating chamber therein for movement relative to said element, said body being open at one end and freely communicating with said gas supply source for introducing gas under pressure into said chamber, said body including wall means defining at least part of said chamber, said wall means including a gas compensating foraminous wall portion, said foraminous wall portion having an exposed guided surface opposite said guide means for the pressure compensating passage of gas from said chamber through said wall portion in sufficient quantity to generate a load carrying gas film between said body and said guide means to hold said body out of contact with said guide means adjacent said guided surface when the mechanism is in operation.

9. A mechanism comprising means for supplying fluid under pressure, a member having an internal pressure chamber open at one end thereof for freely communicating with said fluid supply means whereby fluid under pressure is supplied to said chamber, said member including a foraminous wall defining at least part of said chamber, said wall having an exposed bearing surface, the wall foramina of said foraminous wall providing means to restrict communication of the fluid between said bearing surface and said chamber, guide means having a guide surface closely adjacent said exposed bearing surface of said member, said member being movable relative to said guide means with the respective diameters of the guide means and the member being such as to permit out of contact movement between the two, the fluid under pressure in said chamber passing through said restriction means producing a total load supporting film of fluid under reduced pressure between said bearing and guide surfaces to maintain said bearing and guide surfaces in spaced relationship when the mechanism is in operation.

10. A mechanism comprising a first member which is movable relative to a second member, said first member having a fluid accumulating chamber and a distensible foraminous wall section which defines in part said chamber, said second member having a guide surface confronting said foraminous wall section for defining the path of travel of said first member, and means for applying fluid under pressure to said accumulating chamber to cause the distensible wall section to distend and closely conform to said guide surface.

11. A mechanism comprising a first member which is movable relative to a second member, said first member having a wall which forms upper and lower fluid accumulating chambers for said first member, each of said chambers being formed in at least part by a distensible foraminous wall section, said second member having a guide surface confronting the foraminous wall sections of both chambers for defining the path of travel of said first member, and means for applying fluid under pressure to an accumulating chamber to cause the distensible wall section to distend and closely conform to said guide surface.

12. A mechanism comprising a member, said member having a wall forming upper and lower internal chambers within said member for accumulating fluid under pressure, a casing surrounding said member for defining a fluid containing cavity, said member having an opening at each end thereof providing free communication between said upper and lower internal chambers and said fluid containing cavity, said member being movable relative to said casing in the direction of either of the open ends of the member for accumulating fluid under pressure in the internal chamber whose open end confronts the fluid containing cavity in the direction of the movement of the member, said member having foraminous wall sections at least partially defining said upper and lower internal chambers, each of said foraminous wall sections having an exposed bearing surface closely adjacent said casing, the foramina of said foraminous wall section of the respective chamber in which pressure is being accumulated during movement of the member providing means to restrict communication between said respective chamber and said bearing surface so that fluid passing through said restriction means is caused to create and maintain a total load supporting film of fluid under reduced pressure between said bearing surface and said casing to hold said member in spaced relationship with said casing when the mechanism is in operation.

13. A mechanism comprising a member, said member having a wall forming upper and lower internal chambers within said member for accumulating fluid under pressure, a casing surrounding said member for defining a fluid containing cavity, said member having an opening at each end thereof providing free communication between said upper and lower internal chambers and said fluid containing cavity, said member being movable relative to said casing in the direction of either of the open ends of the member for accumulating fluid under pressure in the internal chamber whose open end confronts the fluid containing cavity in the direction of the movement of the member, said member having foraminous wall sections at least partially defining said upper and lower internal chambers, each of said foraminous wall sections having an exposed bearing surface closely adjacent said casing, the foramina of said foraminous wall section of the respective chamber in which pressure is being accumulated during movement of the member providing means to restrict communications between said respective chamber and said bearing surface so that fluid passing through said restriction means is caused to create and maintain a total load supporting film of fluid under reduced pressure between said bearing surface and said casing to hold said member in spaced relationship with said casing when the mechanism is in operation, the foraminous wall section of each section also being distensible under fluid pressure for causing it to closely conform to said casing while still being in spaced relationship therewith.

14. A mechanism comprising a fluid accumulating device, a casing surrounding said device for defining a fluid containing cavity, said device having a hollow body portion defining a fluid accumulating chamber and being open at one end thereof to freely communicate with the fluid containing cavity, said device also having a substantially smooth outer peripheral surface and a plurality of surface recesses located within the contour generated by the peripheral surface, the respective diameters of said casing and said device peripheral surface being such as to permit relative movement of the two without frictional contact therebetween, said device also having orifices connecting said fluid accumulating chamber to said recesses whereby the fluid accumulated in said device passes through said orifices to said recesses to form a total load supporting film of fluid between said device and said casing to maintain said device and said casing in spaced relationship when the mechanism is in operation.

References Cited in the file of this patent

UNITED STATES PATENTS

| | | |
|---|---|---|
| 198,391 | Jamieson | Dec. 18, 1877 |
| 2,696,410 | Topanelian | Dec. 7, 1954 |